United States Patent [19]
Smith

[11] 3,756,737
[45] Sept. 4, 1973

[54] QUICK CHANGE SPINDLE ADAPTER WITH TWO-PIECE NUT ASSEMBLY

[75] Inventor: Theodore M. Smith, Detroit, Mich.

[73] Assignees: The Theodore M. Smith Trust; Lucille G. Smith, trustee; Theodore M. Smith, trustee, Detroit, Mich.

[22] Filed: Feb. 14, 1972

[21] Appl. No.: 225,872

[52] U.S. Cl. ............... 408/239, 279/1 A, 279/75, 279/82
[51] Int. Cl. .......................................... B23b 31/02
[58] Field of Search .............. 279/82, 99, 75, 22, 279/30, 1 B, 1 A; 408/239; 90/11 A

[56] References Cited
UNITED STATES PATENTS
3,672,692   6/1972   Fauth .................................. 279/82

*Primary Examiner*—Gil Weidenfeld
*Attorney*—Robert A. Sloman

[57] ABSTRACT

A quick change adapter for a power rotated spindle to removably receive a tool holder which includes a cylindrical body mounted on and projecting forwardly of the spindle, with a forwardly retractable spring biased control sleeve movably mounted on said body and so internally threaded two-piece nut assembly adapted to threadedly receive a tool holder which is removably projected into said body and bears against said spindle and wherein a series of spaced balls are nested in said body with portions of the balls extending radially outward operatively engaged by said sleeve and with inner radial portions of said balls retainingly engaging said nut assembly.

6 Claims, 2 Drawing Figures

PATENTED SEP 4 1973

3,756,737

QUICK CHANGE SPINDLE ADAPTER WITH TWO-PIECE NUT ASSEMBLY

BACKGROUND OF THE INVENTION

The present invention is an improvement in the quick change spindle adapter of my co-pending U.S. patent application, Ser. No. 163,946, now U.S. Pat. No. 3,720,907 filed July 19, 1971. One of the difficulties sought to be overcomed in the present application was the problem of preventing accidental disengagement of the nut 4 from its retaining balls 6 under some conditions as where transverse eccentric forces applied to the tool holder 2 either by the set screw 25 or by other factors has a tendancy to cause such transverse radial tilting movement of the nut with respect to the balls that under some conditions, there is the chance that the nut may be accidentally dislodged from said balls.

Furthermore, in the constructin shown in the co-pending application, Ser. No. 163,946, with the outer end portion of the body 22 internally flanged so as to bear against the end of the end of the spindle 1 precise dimensioning was required in order that the cap screw 17 would properly pass through its washer 30 holding the body 22 in position and into the threaded bore 28 of the spindle.

Accordingly, one of the objects of the present invention is to provide a body mounted upon and secured to the spindle and which projects forwardly thereof to removably receive the nut assembly. A straight-through bore for the body is provided to avoid the difficulty of proper location of the cap screw aperture for securing the body to the spindle.

It is another important object to provide an improved two-piece nut assembly which is so designed as to prevent accidental dislodgement of the nut assembly from the spindle carrying body. For this purpose the bore of said body is uniform and straight through. The two-piece nut construction seats directly on the forward end of the spindle. In the present invention, any outward thrust upon the tool or the tool holder is counteracted by increased retaining forces acting through the binding angle ring forming a part of the tool holder nut assembly and resulting in increased holding pressure upon the nut assembly for tightly anchoring the same against outward displacement.

It is a further object to provide an improved two-piece nut assembly which includes a body internally threaded to receive the tool holder and which interlockingly mounts upon its exterior an annular binding angle ring which is retainingly engaged by the balls carried by the body and pressed inwardly by the retractible sleeve in such fashion that any transverse tilting movements of the nut body out of concentricity is ineffective to disengage the nut assembly from the holding mechanism. This accomplishes the main objective of preventing accidetnal forward dislodgement of the nut assembly from the spindle body sleeve combination.

These and other objects will be seen from the following specification and claims in conjunction with the appended drawing in which:

Figures 1, 2:
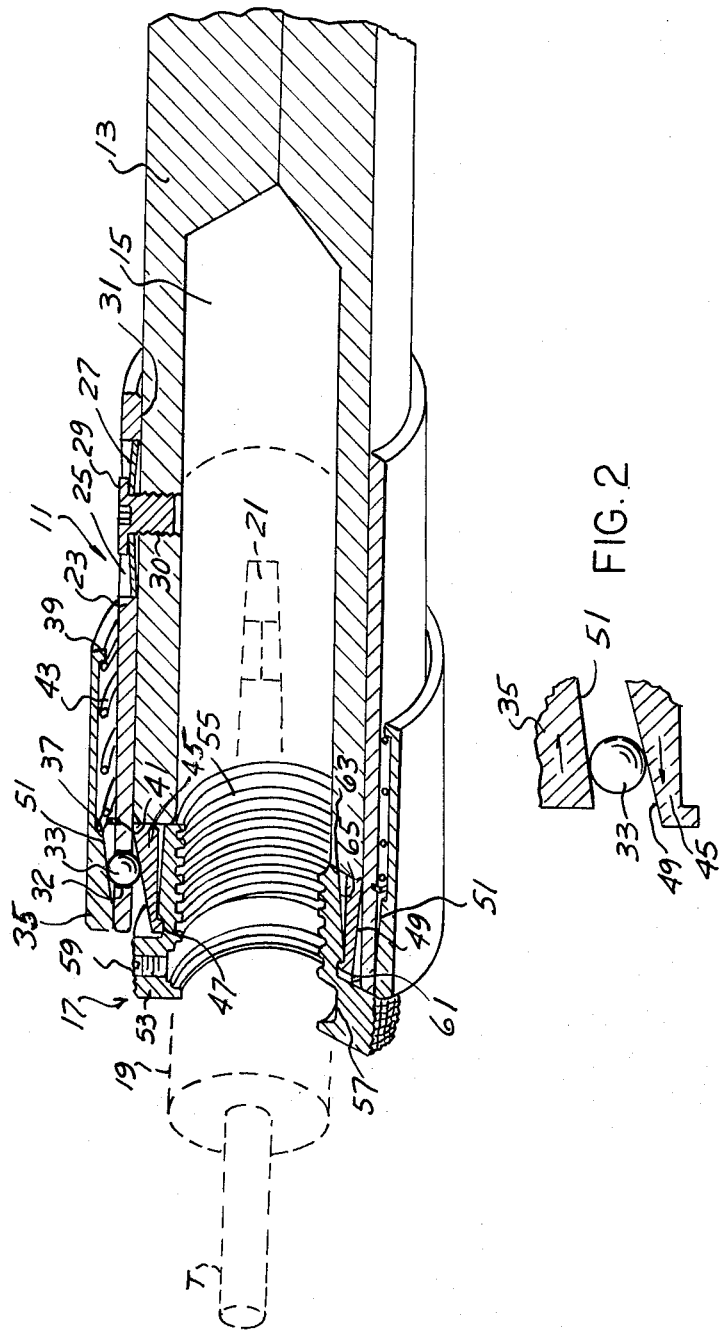
FIG. 1 is a schematic front perspective partly broken away longitudinal view of the present quick change spindle adapter.
FIG. 2 is a schematic fragmentary illustration showing the forces tending to retain tool holder nut assembly against accidental outward release movements.

It will be understood that the above drawing merely illustrates a preferred embodiment of the invention, and that other embodiments are contemplated within the scope of the claims hereafter set forth.

DETAILED DESCRIPTION

Referring to the drawing, the quick change spindle adapter 11 includes the power rotated spindle 13 fragmentarily shown and broken away for illustration which has an internal bore 15, a two-piece adjustment nut assembly 17 adapted to threadedly receive tool holder 19 having a tapered or other bore 21 to removably receive the tool T which may be a bore, a counterbore, a drill, a tap or other cutting tool.

Elongated cylindrical body 23 which is mounted on and around the spindle has a uniform bore 31 and projects forwardly of said spindle to cooperatively receive the two-piece nut assembly 17.

Transverse elongated slot 25 is formed through body 23 and is adapted to receive the flexible locking washer 27 centrally apertured to receive cap screw 29. The latter threadedly extends into the radial bore 30 within said spindle. This construction provides a convenient means for anchoring the body to the spindle in the same manner as shown in the said co-pending application. Said washer may be oblong or round.

Said body at its forward end has a series of spaced radial apertures 32 within which are movably positioned a corresponding series of balls 33. These balls cooperate with sleeve 35 and are adapted to retainingly engage the nut assembly 17.

Sleeve 35 includes a pair of interior longitudinally spaced shoulders 39 and 37. The split or other ring 41 is mounted upon body 23 within a corresponding annular slot therein and is adapted to retainingly engage shoulder 37.

Coiled compression spring 43 surrounds said body, at one end engages the ring 41 and at its opposite end retainingly engages the internal flange 39 of said sleeve to bias the sleeve to the position shown in FIG. 1 relative to said body. The sleeve is adapted for manual forward movement relative to said body for disengaging the nut assembly as hereafter described.

Said sleeve has an interior annular rearwardly and outwardly tapered portion 51 adapted for cooperative registry with balls 33.

TWO-PIECE NUT ASSEMBLY

The present adjustment nut assembly 17 includes an elongated nut body 53 internally threaded at 55 to threadedly receive and engage and retain tool holder 19. Radial set screw 59 extends into said body, terminates in the internal annular groove 57 and is adapted for operative retaining registry with tool holder 19.

The nut body has an external annular slot 61 and annular portions rearwardly thereof are tapered inwardly to provide a clearance space with respect to the annular binding angle ring 45.

Said ring at its forward end has an internal annular flange 47 which nests within the external annular slot 61 of said body. Said binding angle ring upon its outer surface is tapered rearwardly and outwardly as at 65 for cooperative registry with the corresponding balls 33.

Accordingly, with the arrangement of the parts shown in FIG. 1, the internal tapered portion 51 of said sleeve is in cooperative engaging registry with balls 33 which, in turn, retainingly register with the external taper 49 of said binding angle ring.

It is noted from FIG. 1 as well as the schematic illustration, FIG. 2, that the tapered surfaces 49 and 51 may be parallel for proper operation, but in the illustrative embodiment, slightly converge towards each other rearwardly for improved and increased holding action. Body 53 of the nut assembly at its inner end seats as at 63 upon the outer end of spindle 13.

As shown in FIG. 2, any outward thrust upon the tool or tool holder 19 with corresponding thrusts upon the nut body 53 and ring 45 causes the balls 33 to rotate clockwise. Ball 33 frictionally engaging the outer sleeve 35 tends to force the same axially inward as shown by the arrow. This tends to increase its retaining force on the balls to more tightly anchor the nut against such displacement.

Any forward force or motion on the nut body 53 and its associated ring 45 thus causes the balls to roll inwardly for further anchoring of the nut assembly. In view of the fact that the center distance between the two tapered surfaces between the ring and the sleeve are slightly reduced in a rearward direction, there is provided an increased holding force for anchoring and securing the nut against accidental displacement from body 23.

In the present construction, the clamp binding angle member 45 is reasonably centralized. It is not effected by any eccentricity or radial tilting movements of the nut body with respect to the clamp binding angle member. This is possible because of the loose relationship between said binding angle member or ring 45 and the outside surface of the nut body 53. This permits transverse tilting movements of the nut body with respect to the longitudinal axis of the spindle without in any manner effecting the retaining and holding force of the binding angle ring 45.

In normal use when the set screw 59 has become tightened with respect to the tool holder 19, this has a tendancy of displacing the nut axis with respect to the tool holder axis, thus, causing some eccentricity and out of parallel with the spindle axis. In the old type of construction where the nut was in one piece, such eccentricity created due to the threaded engagement of the nut with respect to the tool holder if a little loose or sloppy would result in uneven forces on the balls 33 so that there was a chance of accidental dislodgement of the nut with respect to the body on the spindle or a failure of the balls to anchor and retain the nut and its associated tool holder.

In the present construction even if there is some wobbling or eccentricity of the axis of the inner nut assembly or body, this does not effect the centralized location of the binding angle ring 45. Thus the oressures upon the balls exerted through the sleeve are continuous holding pressures and there can be no accidental dislodgement of the tool holder and nut from the spindle-body assembly.

Having described my invention, reference should now be had to the following claims.

I claim:

1. A quick change adapter for a power rotated spindle having a bore adapted to receive a tool holder;
a cylindrical body having a uniform bore mounted upon and secured to said spindle and projecting forwardly thereof;
a forwardly retractable spring biased sleeve movably mounted on said body and including an axially tapered inner wall portion;
and an internally threaded nut assembly adapted to threadedly receive said tool holder, projected into said body and bearing against said spindle the exterior surface of said nut being tapered;
there being a series of spaced balls nested in said body; portions of said balls projected radially inward retainingly engaging the tapered surface of said nut assembly and projected radially outward for operative engagement with said sleeve tapered inner wall portion, whereby forward retraction of said sleeve releases said balls facilitating assembly and manual removal of said tool holder and nut assembly.

2. A quick change adapter for a power rotated spindle having a bore adapted to receive a tool holder;
a cylindrical body having a uniform bore mounted upon and secured to said spindle and projecting forwardly thereof;
a forwardly retractable spring biased sleeve movably mounted on said body and including an axially tapered inner wall portion;
and an internally threaded nut assembly adapted to threadedly receive said tool holder, projected into said body and bearing against said spindle;
there being a series of spaced balls nested in said body; portions of said balls projected radially inward retainingly engaging said nut assembly and projected radially outward for operative engagement with said sleeve tapered inner wall portion, whereby forward retraction of said sleeve releases said balls facilitating assembly and manual removal of said tool holder and nut assembly;
said nut assembly including a body which is internally threaded;
and an annular tapered binding angle ring internally interlocked with said body against relative axial movement, said body being free for radial tilting movements relative to said ring; the exterior surface of said ring being tapered for cooperative registry with said balls.

3. In the quick change adapter of claim 2, the tapered inner wall portions of said sleeve being substantially parallel to the external tapered wall of said binding angle ring.

4. In the quick change adapter of claim 3, the tapered inner wall portion of said sleeve converging rearwardly towards the external tapered wall of said binding angle ring.

5. A quick change adapter for a power rotated spindle having a bore adapted to receive a tool holder;
a cylindrical body having a uniform bore mounted upon and secured to said spindle and projecting forwardly thereof;
a forwardly retractable spring biased sleeve movably mounted on said body and including an axially tapered inner wall portion;
and an internally threaded nut assembly adapted to threadedly receive said tool holder, projected into said body and bearing against said spindle;
there being a series of spaced balls nested in said body; portions of said balls projected radially inward retaininginly engaging said nut assembly and projected radially outward for operative engagement with said sleeve tapered inner wall portion, whereby forward retraction of said sleeve releases said balls facilitating assembly and manual removal of said tool holder and nut assembly;

said nut assembly including a body which is internally threaded and whose outer wall is tapered rearwardly inward;

and an annular tapered binding angle ring internally interlocked with said body against relative axial movement, said body being free for radial tilting movements relative to said ring;

the exterior surface of said ring being tapered for cooperative registry with said balls, the interlock between said body and binding angle ring including an annular recess on said body, and an internal annular flange on said ring nested in said recess.

6. The combination of a power driven spindle having a bore, a cylindrical body secured thereon and projecting forwardly thereof, a retractable spring biased sleeve on the body and balls on said body operably engaged by said sleeve, a nut assembly projected into said body and bearing against said spindle; adapted to threadably receive a tool holder, portions of said balls being projected radially inward retainingly engaging said nut assembly, whereby forward retraction of said sleeve releases said balls facilitating assembly and manual removal of said nut assembly, said nut assembly including a body which is internally threaded, and an annular tapered binding angle ring internally interlocked with said body against relative axial movement, said body being free for radial tilting movements relative to said ring; the exterior surface of said ring being tapered for cooperating registry with said balls.

* * * * *